United States Patent
Cavalieri et al.

(10) Patent No.: US 9,527,935 B2
(45) Date of Patent: Dec. 27, 2016

(54) RANDOM COPOLYMER OF PROPYLENE WITH 1-HEXENE

(75) Inventors: Claudio Cavalieri, Ferrara (IT); Monica Galvan, Ferrara (IT); Fiorella Pradella, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 206 days.

(21) Appl. No.: 14/128,286

(22) PCT Filed: Jul. 6, 2012

(86) PCT No.: PCT/EP2012/063199
§ 371 (c)(1),
(2), (4) Date: Dec. 20, 2013

(87) PCT Pub. No.: WO2013/004803
PCT Pub. Date: Jan. 10, 2013

(65) Prior Publication Data
US 2014/0134911 A1    May 15, 2014

Related U.S. Application Data

(60) Provisional application No. 61/505,478, filed on Jul. 7, 2011.

(30) Foreign Application Priority Data

Jul. 6, 2011  (EP) .................................. 11172929

(51) Int. Cl.
| | | |
|---|---|---|
| *C08F 10/14* | (2006.01) |
| *C08F 210/06* | (2006.01) |
| *D01F 6/30* | (2006.01) |
| *D01D 5/08* | (2006.01) |
| *D04H 3/16* | (2006.01) |
| *C08F 8/50* | (2006.01) |

(52) U.S. Cl.
CPC ................. *C08F 10/14* (2013.01); *C08F 8/50* (2013.01); *C08F 210/06* (2013.01); *D01D 5/08* (2013.01); *D01F 6/30* (2013.01); *D04H 3/16* (2013.01); *C08F 2800/20* (2013.01); *C08F 2810/10* (2013.01); *Y10T 442/60* (2015.04); *Y10T 442/681* (2015.04)

(58) Field of Classification Search
CPC ........ D04H 1/00; D04H 13/00; D04H 13/001; C08L 23/12; C08L 23/00; C08L 23/05
USPC ..... 428/357, 364, 365, 375, 296.7; 442/181, 442/327, 401, 333, 361, 365, 398, 416
See application file for complete search history.

(56) References Cited

U.S. PATENT DOCUMENTS

| 6,476,172 B1 | 11/2002 | Wachowicz et al. | |
|---|---|---|---|
| 7,674,731 B2 * | 3/2010 | Marzolla et al. ............. | 442/365 |
| 2013/0137329 A1 * | 5/2013 | Van Paridon et al. ........ | 442/351 |

FOREIGN PATENT DOCUMENTS

| WO | WO00/63471 A1 | 10/2000 |
|---|---|---|
| WO | WO2005/059210 A1 | 6/2005 |
| WO | WO2011/009704 A1 | 1/2011 |

OTHER PUBLICATIONS http://www.ivyroses.com/Chemistry/Organic/Homologous-Series. php May 15, 2016.*
PCT International Search Report & Written Opinion mailed Sep. 9, 2012, for PCT/EP2012/063199.

* cited by examiner

*Primary Examiner* — Arti Singh-Pandey

(57) ABSTRACT

A propylene and 1-hexene copolymer containing from 0.5 wt % to less than 5 wt % of 1-hexene derived units said copolymer having:
  a) a melting point higher than 145° C.;
  b) a melt flow rate (MFR2) determined according to ISO method 1133 (230° C., 2.16 kg ranging from 10 dl/10 min to less than 60 dl/10 min;
    said copolymer being chemically degradated to MFR2 and wherein the ratio MFR2/MFR1 is comprised between 15 and 56; wherein MFR1 is the melt flow rate measured according to ISO method 1133 (230° C., 2.16 kg) of the propylene/1-hexene copolymer before the degradation.

10 Claims, No Drawings

RANDOM COPOLYMER OF PROPYLENE WITH 1-HEXENE

This application is the U.S. National Phase of PCT International Application PCT/EP2012/063199, filed Jul. 6, 2012, claiming priority of European Patent Application No. 11172929.9, filed Jul. 6, 2011, and the benefit under 35 U.S.C. 119(e) of U.S. Provisional Application No. 61/505,478 filed Jul. 7, 2011, the contents of which are incorporated herein by reference in their entirety.

FIELD OF THE INVENTION

The present invention relates random copolymers of propylene with 1-hexene especially fit for the production of fibres.

Within the definition of fibres are also included the manufactured products similar to fibres, such as fibrils and cut filaments (staple fibres).

BACKGROUND OF THE INVENTION

Fibres comprising copolymers of propylene with a low content of 1-hexene are already known in the art.

International patent application WO-A1-95/32091 discloses fibres comprising a homo or copolymer of propylene having a melting point in the range from 100° C. to 145°. The applicant discovered that better results in some application can be achieved by using copolymer having higher melting point.

International patent application WO-A1-96/27041 discloses fabrics with a very pleasing hand. Said performance is obtained with fibres made from copolymers of propylene and an α-olefin, such as ethylene, 1-butene and 1-hexene. The 1-hexene derived unit content is from 2 wt % to 5 wt % and the preferred melt flow rate (MFR) ranges from 10 to 50 dl/10 min. The applicant found that in is possible to improve the feature of the fibres by selecting among other features of the copolymer a sub MFR range, said MFR range being obtained by visbreaking the starting polymer.

International patent application WO-A1-2005/059210 discloses fibres for thermal bonding applications made of semicrystalline random copolymers of propylene with 1-hexene having a low degree of modification of the polymer. The amount of 1-hexene ranges from 1.5 to less than 3 wt % with respect to the total weight of the copolymer. The said copolymers possess a value of melt flow rate (MFR) ranging from 4 to 35 g/10 min, preferably from 8 to 20 g/10 min. In the example given, the said copolymer comprises an amount of 1-hexene of 2.9 wt % and shows a melt index of 10.1 dg/min. The applicant found that is possible to improve the properties of said fibres by fine tuning the properties of the starting copolymer and subjecting it to a visbreaking process.

SUMMARY OF THE INVENTION

The applicant has now surprisingly found fibres showing a very good balance of mechanical properties can be obtained by using a propylene/1-hexene copolymer being subjected to a certain degree of visbreaking and having particular features.

Thus an object of the present invention is a propylene/1-hexene copolymer containing from 0.5 wt % to less than 5 wt %, preferably from 0.8 wt % to less than 3 wt %, more preferably from 1.1 wt % to 2.4 wt % of 1-hexene derived units; even more preferably from 1.1 wt % to 1.8 wt % said copolymer having:

a) a melting point higher than 145° C. preferably comprised between 146° C. and 154° C.;
b) a melt flow rate (MFR2) determined according to ISO method 1133 (230° C., 2.16 kg ranging from 10 gr/10 min to less than 60 dl/10 min; preferably from 20 dl/10 min to 40 dl/10 min;

said copolymer being chemically degradated to MFR2 and wherein the ratio MFR2/MFR1 is comprised between 15 and 56; preferably between 21 and 51; more preferably between 27 and 42; even more preferably between 32 and 37, wherein MFR1 is the melt flow rate measured according to ISO method 1133 (230° C., 2.16 kg) of the propylene/1-hexene copolymer before the degradation.

DETAILED DESCRIPTION OF THE INVENTION

The propylene/1-hexene copolymer object of the present invention is particularly suitable for the production of fibres. Thus a further object of the present invention is a fibre comprising a propylene/1-hexene copolymer containing from 0.5 wt % to less than 5 wt %, preferably from 0.8 wt % to less than 3 wt %, more preferably from 1.1 wt % to 2.4 wt % of 1-hexene derived units; even more preferably from 1.1 wt % to 1.8 wt % said copolymer having:

a) a melting point higher than 145° C. preferably comprised between 146° C. and 154° C.;
b) a melt flow rate (MFR2) determined according to ISO method 1133 (230° C., 2.16 kg ranging from 10 to 60 g/10 min, preferably from 20 to 40 g/10 min, even more preferably from 25 to 35 g/10 min and said copolymer being chemically degradated to MFR2 and wherein the ratio MFR2/MFR1 is comprised between 15 and 56; preferably between 21 and 51; more preferably between 27 and 42; even more preferably between 32 and 37, wherein MFR1 is the melt flow rate measured according to ISO method 1133 (230° C., 2.16 kg) of the propylene/1-hexene copolymer before the degradation.

The fibres of the invention typically exhibit a value of tenacity at least equal to or higher than 25 cN/tex, preferably higher than 30 cN/tex, and a value of elongation at break at least equal to or higher than 190%, preferably equal to or higher than 200%. Preferably these values are obtained with the fibres having a titre ranging from 1 to 4 dtex, preferably from 1.5 to 2.5 dtex.

Typically, the fibres according to the present invention have a titre ranging from 1 to 4 dtex, preferably from 1.5 to 2.5 dtex.

The fibres of the present invention can be efficiently spun at speeds that are typically higher than 3600 m/min, preferably higher than 4000 m/min. More preferably, the fibres of the invention are spun at a speed of at least 4500 m/min.

The fibres of the invention can be spun at temperatures generally varying from 200° to 300° C. Preferably, the spinning temperature is lower than 250° C., even more preferably, the spinning temperature is higher than 230° and lower than 250° C.

The random copolymers of the invention have stereoregularity of isotactic type, this is shown by the low xylene soluble content at 25° C. that is lower than 5 wt % preferably lower than 4 wt %, more preferably lower than 3 wt %.

According to the present invention the term "copolymer" includes only propylene and 1-hexene.

Typically, said copolymers exhibit a solubility in xylene at 25° C. below 5 wt %, preferably below 4 wt %, more preferably below 3 wt %.

Typically, the copolymers of the invention have a polydispersity index, determined with the rheological method described in the characterization section below, from 3 to 7, more preferably from 3 to 5.

The fibres of the present invention can be used for the manufacture of non-woven fabrics showing excellent properties.

Such non-woven fabrics may be produced with various methods, preferably through the well-known spunbonding technique. The spunbonding process is a non-woven manufacturing technique, whereby polymers are directly converted into endless filaments and stochastically deposited to form a non-woven material.

Spunbonded non-woven fabrics manufactured with the fibres of the invention typically show a tenacity in the machine direction (MD) higher than 43 N, preferably higher than 45 N and a tenacity in the cross direction (TD) higher than 22 N, preferably higher than 25 N.

Moreover, the spunbonded non-woven fabrics manufactured with the fibres of the invention typically show an elongation at break in the machine direction (MD) higher than 50%, preferably higher than 55% and an elongation at break in the cross direction (TD) higher than 55%, preferably higher than 65%.

Thus a further object of the present invention is spunbonded non-woven fabrics manufactured with the fibres of the invention, The fibers of the present invention can also contain formulations of stabilizers suited for obtaining a skin-core structure (skin-core stabilization), or a highly stabilizing formulation. In the latter case, a superior resistance to aging is achieved for durable nonwovens.

According to a preferred embodiment, the propylene-hexene-1 random copolymers of the invention are subjected to chemical degradation (visbreaking) in order to improve their rheological performance during the fibre manufacturing process, especially during the spunbonding process.

According to said preferred embodiment, the fibres of the present invention are obtainable by a process comprising the following steps:

(1) polymerizing a monomer mixture comprising propylene and hexene-1 in at least one polymerization step in presence of highly stereospecific heterogeneous Ziegler-Natta catalyst systems to obtain a propylene and hexene copolymer precursor having a MFR(1) lower than 4 g/10 min, preferably from 0.4 to 3 g/10 min, even more preferably from 0.5 to 1.5 g/10 min;

(2) subjecting said copolymer precursor to chemical degradation (visbreaking) to obtain a propylene polymer having MFR(2) ranging from 10 to 60 g/10 min, preferably from 20 to 40 g/10 min, even more preferably from 25 to 35 g/10 min and, (3) spinning the visbroken polymer obtained in the previous step.

By "copolymer precursor" is meant therein a propylene copolymer differing from the propylene copolymer obtained after the visbreaking step only for the MFR value.

The said chemical degradation (visbreaking) step (2) can be carried out by treating the precursor propylene polymer with appropriate amounts, preferably from 0.001 to 0.20 wt %, more preferably from 0.05 to 0.1 wt %, of free radical initiators according to processes well-known in the art. Preferably, the chemical degradation is carried out by contacting under high shear conditions the polymeric material with at least one free radical initiator at a temperature equal to or higher than the decomposition temperature of the free radical initiator. Preferred free radical initiators are peroxides having a decomposition temperature higher than 250° C. preferably ranging from 150° to 250° C., such as di-tert-butyl peroxide, dicumyl peroxide, the 2,5-dimethyl-2,5-di(tert-butylperoxy)hexyne, and 2,5-dimethyl-2,5-di(tert-butylperoxy)hexane (traded by Akzo or Arkema under the name Trigonox 101 or Luperox 101 rispectively).

The propylene-hexene-1 polymers used in the present invention can be prepared by polymerisation in one or more polymerisation steps. Such polymerisation is preferably carried out in the presence of Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminium compound, such as an aluminium alkyl compound.

An external donor is optionally added.

The catalysts generally used in the process of the invention are capable of producing propylene polymers with a value of xylene insolubility at 25° C. greater than 90%, preferably greater than 95%.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are 1,3-diethers of formula:

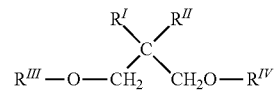

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis (methoxymethyl) fluorene.

Other suitable electron-donor compounds are phthalic acid esters, such as diisobutyl, dioctyl, diphenyl and benzylbutyl phthalate.

The preparation of the above mentioned catalyst components is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical. Examples of silicon compounds are (tert-butyl)$_2$Si(OCH$_3$)$_2$, (cyclohexyl)(methyl)Si (OCH$_3$)$_2$, (cyclopentyl)$_2$Si(OCH$_3$)$_2$, (phenyl)$_2$Si(OCH$_3$)$_2$ and (1,1,2-trimethylpropyl)Si(OCH$_3$)$_3$, which is preferred.

1,3-diethers having the formulae described above can also be used advantageously. If the internal donor is one of these diethers, the external donors can be omitted.

In particular, even if many other combinations of the previously said catalyst components may allow to obtain propylene polymer compositions according to the present invention, the random copolymers of propylene and 1-hexene are preferably prepared by using catalysts containing a phthalate as inside donor and (cyclopentyl)$_2$Si(OCH$_3$)$_2$ as outside donor, or the said 1,3-diethers as inside donors.

The said propylene-hexene-1 copolymers are typically produced by well-known polymerisation processes. According to a preferred embodiment, the polymerisation process is carried out in one or more stage(s). In case the two or more stages of polymerisation are carried out, the copolymers are prepared in sequential stages. In each stage the operation takes place in the presence of the copolymer obtained and the catalyst in the preceding stage.

According to another polymerisation process the copolymers are produced by a polymerisation process carried out in at least two interconnected polymerisation zones.

The process according to the preferred process is illustrated in EP application 782 587.

In detail, the said process comprises feeding the monomers to said polymerisation zones in the presence of catalyst under reaction conditions and collecting the polymer product from the said polymerisation zones. In the said process the growing polymer particles flow upward through one (first) of the said polymerisation zones (riser) under fast fluidisation conditions, leave the said riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it become possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, preferably from 2 to 15 m/s.

Generally, the copolymers and the gaseous mixture leaving the riser are conveyed to a solid/gas separation zone. The solid/gas separation can be effected by using conventional separation means. From the separation zone, the copolymers enter the downcomer. The gaseous mixture leaving the separation zone is compressed, cooled and transferred, if appropriate with the addition of make-up monomers and/or molecular weight regulators, to the riser. The transfer can be done by means of a recycle line for the gaseous mixture.

The control of the copolymer circulating between the two polymerisation zones can be done by metering the amount of polymer leaving the downcomer using means suitable for controlling the flow of solids, such as mechanical valves.

The operating parameters, such as the temperature, are those that are usual in gas-phase olefin polymerisation process, for example between 50 to 120° C.

This first stage process can be carried out under operating pressures of between 0.5 and 10 MPa, preferably between 1.5 to 6 MPa.

Advantageously, one or more inert gases are maintained in the polymerisation zones, in such quantities that the sum of the partial pressure of the inert gases is preferably between 5 and 80% of the total pressure of the gases. The inert gas can be nitrogen or propane, for example.

The various catalysts are fed up to the riser at any point of the said riser. However, they can also be fed at any point of the downcomer. The catalyst can be in any physical state, therefore catalysts in either solid or liquid state can be used.

The copolymers and polyolefin compositions of the invention may further comprise additives commonly employed in the polyolefin field, such as antioxidants, light stabilizers, nucleating agents, antiacids, colorants, fillers and processing improvers, said additives being normally added to the random copolymer (A) and/or polyolefin (B) and/or composition (C) according to methods well known in the art.

Fibres or filaments comprising the random copolymer of the invention may be prepared using processes and apparatuses well known in the art, i.e. by melt-spinning the random copolymer or the propylene polymer composition in conventional devices suitable for producing single or composite fibres. The random copolymer or the propylene polymer composition of the invention show an extremely good spinnability, i.e. they can be spun into fibres or filaments at high spinning speeds without breaking, and resulting at the same time in fibres or filaments which retain good mechanical properties, i.e. high tenacity and high elongation at break.

As mentioned above, the fibres of the present invention are particularly suited for preparing articles, such as non-woven fabrics, in particular spunbonded non-woven fabrics.

The spunbonding process combines the fibre spinning and the web formation into a single production process. Fibres are formed as the molten polymer exits the spinnerets, normally quenched by cool air and the filaments are pulled away from the spinneret by high pressure air. Then the filaments are deposited onto a moving belt forming a non-woven fabric. The fabric weight is determined by the throughput per spinneret hole, the number of holes and the speed of the moving belt. Subsequently, the fabric can be bonded by different methods, such as thermal bonding, chemical bonding or needle punching, thermal bonding being preferred. By thermal bonding the fabric is passed between calender rolls heated at a temperature normally comprised in the range from 110° to 150° C., preferably from 120° to 130° C.

The thermally bonded articles may comprise two or more non-woven layers. Thanks to the use of the fibres of the present invention a good adhesion among the layers is obtained.

EXAMPLES

The following examples are given to illustrate the present invention without limiting purpose.

The data relating to the polymeric materials and the fibres of the examples are determined by way of the methods reported below:

Melting temperature: Determined by differential scanning calorimetry (DSC). A sample weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, temperatures corresponding to peaks are read.

Melt Flow Rate: Determined according to ISO method 1133 (230° C., 2.16 kg).

Solubility in xylene at 25° C.: Determined as follows: 2.5 g of polymer and 250 ml of xylene are introduced in a glass flask equipped with a refrigerator and a magnetical stirrer. The temperature is raised in 30 minutes up t the boiling pint of the solvent. The so obtained clear solution is then kept under reflux and stirring for further 30 minutes. The closed flask is then kept in thermostatic water bath at 25° C. for 30 minutes. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

1-hexene content:
Determined by IR spectroscopy
The spectrum of a pressed film of the polymer is recorded in absorbance vs. wavenumbers ($cm^{-1}$). The following measurements are used to calculate C6 content:

Area ($A_t$) of the combination absorption bands between 4482 and 3950 $cm^{-1}$ which is used for spectrometric normalization of film thickness.

A linear baseline is subtracted in the 790-660 $cm^{-1}$ range and the remaining constant offset is eliminated The C6 contents are obtained by applying a Partial Least Square (PLS1) multivariate regression to the 790-660 $cm^{-1}$ range.

Polydispsersity Index (PI): Determined according to ISO 6721-10 method. PI is calculated by way of a dynamic test carried out with a RMS-800 rheometric mechanical spectrometer. The PI is defined by the equation $$PI=10^5/Gc,$$

where the Gc (crossover modulus) value is the one where G' (storage modulus) coincides with G" (loss modulus). A sample is prepared with one gram of polymer, said sample having a thickness of 3 mm and a diameter of 25 mm; it is then placed in the above mentioned apparatus and the temperature is then gradually increased until it reaches a temperature of 200 C after 90 minutes. At this temperature one carries out the test where G' and G" are measured in function of the frequency.

Titre of fibres: from a 10 cm long roving, 50 fibres are randomly chosen and weighed. The total weight of the said 50 fibres, expressed in mg, is multiplied by 2, thereby obtaining the titre in dtex.

Tenacity and elongation at break: from a 500 m roving a 100 mm long segment is cut. From this segment the single fibres to be tested are randomly chosen. Each single fibre to be tested is fixed to the clamps of an Instron dinamometer (model 1122) and tensioned to break with a traction speed of 20 mm/min for elongations lower than 100% and 50 mm/min for elongations greater than 100%, the initial distance between the clamps being of 20 mm. The ultimate strength (load at break) and the elongation at break are determined.

The tenacity is derived using the following equation:

Tenacity=Ultimate strength (cN)×10/titre (dtex)

Tenacity and elongation of the non-woven fabric: according to EDANA ERT 20.2-8 (sample width=50 mm, gauge length=200 mm, tensile speed=100 mm/min).

Examples 1 and Comparative Examples 2-3

Preparation of the Solid Catalyst Component

Into a 500 mL four-necked round flask, purged with nitrogen, 250 mL of $TiCl_4$ are introduced at 0° C. While stirring, 10.0 g of microspheroidal $MgCl_2.2.8C_2H_5OH$ (prepared according to the method described in example 2 of U.S. Pat. No. 4,399,054 but operating at 3000 rpm instead of 10000 rpm), 9.1 mmol diisobutylphthalate as internal electron-donor compound is added. The temperature is raised to 100° C. and maintained for 120 min. Then, the stirring is discontinued, the solid product is allowed to settle and the supernatant liquid is siphoned off. Then 250 ml of fresh TiCl$_4$ are added. The mixture is reacted at 120° C. for 60 min and, then, the supernatant liquid is siphoned off. The solid is washed six times with anhydrous hexane (6×100 ml) at 60° C.

The solid catalyst component is used with dicyclopentyldimethoxysilane (DCPMS) as external-donor component and triethylaluminium.

Polymerization

Copolymers are prepared by polymerising propylene and hexene-1 in the presence of the above catalyst under continuous conditions in a plant comprising a gas-phase polymerisation apparatus. The apparatus comprises two interconnected cylindrical reactors (riser and downcomer). Fast fluidisation conditions are established in the riser by recycling gas from the gas-solid separator.

The hydrogen concentration is kept at the same concentration in both riser and downcomer and the hexene-1 is fed only into the downcomer.

The polymer particles exiting the reactor are subjected to a steam treatment to remove the reactive monomers and volatile substances and then dried.

Other operative conditions and the properties of the produced copolymers are indicated in

TABLE 1

| | Examples | | |
|---|---|---|---|
| | 1 | 2* | 3* |
| Polymerisation conditions | | | |
| Temperature, ° C. | 85 | 75 | 75 |
| Pressure, bar-g | 25 | 27 | 26 |
| H$_2$/C$_3^-$, mol/mol | 0.001 | 0.006 | 0.01 |
| C$_6^-$/(C$_6^-$ + C$_3^-$), mol/mol | 0.013 | 0.010 | 0.012 |
| Properties of the copolymers | | | |
| Hexene-1 Content, wt % | 1.5 | 1.5 | 1.5 |
| Melt Flow Rate, g/10 min (MFR1) | 0.7 | 2.0 | 10 |
| Melting Temperature, ° C. | 148 | 149 | 148 |
| Xylene-Soluble Content, wt % | 2.4 | 2.5 | 2.4 |

*comparative
C$_3^-$ propylene
C$_6^-$ 1-hexene

Propylene polymer of example 1-3 are extruded the in the presence of the following additives: calcium stearate, Irganox® B215 (traded by Ciba Specialty Chemicals), Trigonox® 101, a peroxide traded by Akzo as reported in table 2.

TABLE 2

| | | Resulting polymer | | | |
|---|---|---|---|---|---|
| | | A | B* | C* | D* |
| | | Polymer from example | | | |
| | | 1 | 2 | 3 | 3 |
| calcium stearate | Wt % | 0.04 | 0.04 | 0.04 | 0.04 |
| Irganox ® B215 | Wt % | 0.15 | 0.15 | 0.15 | 0.15 |
| Trigonox ® | Wt % | 0.08 | 0.05 | 0 | 0.01 |

*comparative

A conventional twin screw extruder Coperion Werner & Pfleiderer ZSK58 MC is used with operating conditions as follows: screw speed of 260 rpm, extruder throughput of 250 Kg/h, specific energy of 0.183 kwh/kg, melt temperature of 214° C., die pressure of 51 bar, melt filter of 200 mesh.

Production of Fibres

After extrusion the polymer compositions are spun to produce fibres and non-woven fabrics using a Reicofil® 4 spunbonding line from Reifenhäuser. The spinnability tests are carried out at different temperatures and spinning speed in typical Reicofil® 4 operating conditions (number of holes in the spinneret equal to 7377, corresponding to 6827 holes/m; exit diameter of each hole of 0.6 mm; throughput per hole of 0.57 g/min). The draw ratio is 1.5. Other spinning conditions and the properties of the spunbonded fibres thus obtained are reported in

TABLE 3

| | | Resulting polymer | | | |
|---|---|---|---|---|---|
| | | A | B* | C* | D* |
| C6 | % wt | 1.4 | 1.5 | 1.4 | 1.4 |
| MFR on pellets | | 25.7 | 24.5 | 10 | 22 |
| max speed | m/min | 4500 | 4500 | 3900 | 3900 |
| tenacity | cN/Tex | 31.9 | 34 | 24 | 21.7 |
| elongation | % | 240 | 200 | 190 | 280 |

*comparative

TABLE 4

| | Resulting polymer | | | |
|---|---|---|---|---|
| | A | B* | C* | D* |
| Spinning Temperature, ° C. | 238 | 238 | 238 | 238 |
| Maximum Spinning Speed, m/min | 4500 | 4500 | 3900 | 3900 |
| Properties of the fibre | | | | |
| MFR2 (g/10 min) | 25 | 25 | 10 | 25 |
| MFR2/MFR1 | 35.7 | 12.6 | 2.5 | 1 |
| Titre, dtex | 2.2 | 2.2 | 2.2 | 2.2 |
| Tenacity, cN/tex | 34 | 32 | 24 | 21.7 |
| Elongation at Break, % | 240 | 200 | 190 | 220 |

*comparative

Table 4 shows that the fibres obtained by using the MFR2/MFR1 ration according to the present invention are endowed with enhanced tenacity and elongation at break.

Table 5 below shows the enhanced properties of the non-woven fabrics obtained through spunbonding from the fibres of polymer A.

TABLE 5

| | Polymer A |
|---|---|
| Tenacity (MD), N | 49.6 |
| Elongation (MD), % | 58.7 |
| Tenacity (TD), N | 26.5 |
| Elongation (TD), % | 67.2 |

MD = machine direction; TD = cross direction.

What is claimed is:

1. A propylene and 1-hexene copolymer containing from 0.5 wt. % to less than 5 wt. % of 1-hexene derived units comprising:
   a) a melting point higher than 145° C.;
   b) a melt flow rate (MFR2) determined according to ISO method 1133 (230° C., 2.16 kg) ranging from 10 to 60 g/10 min; and c) a melt flow rate (MFR1) determined according to ISO method 1133 (230° C., 2.16 kg) from 0.17 to less than 4 g/10 min, wherein said copolymer is chemically degraded to MFR2; wherein the ratio MFR2/MFR1 is between 21 and 51; wherein MFR1 is the melt flow rate measured according to ISO method 1133 (230° C., 2.16 kg) of the propylene/1-hexene copolymer before the degradation.

2. The propylene and 1-hexene copolymer according to claim 1 containing from 0.8 wt. % to less than 3 wt. % of 1-hexene derived units.

3. The propylene and 1-hexene copolymer according to claim 2 containing from 1.1 wt. % to 2.4 wt. % of 1-hexene derived units.

4. The propylene and 1-hexene copolymer according to claim 1 wherein the ratio MFR2/MFR1 is comprised between 27 and 42.

5. The propylene and 1-hexene copolymer according to claim 1 having a melt flow rate (MFR2) determined according to ISO method 1133 (230° C., 2.16 kg ranging from 20 g/10 min to 40 g/10 min.

6. A fiber comprising the propylene and 1-hexene copolymer of claim 1.

7. A non-woven fabric comprising the fibers of claim 6.

8. The non-woven fabric of claim 7 being spunbonded non-woven fabrics.

9. The fiber of claim 6, comprising a tenacity of at least 25 cN/tex.

10. The propylene and 1-hexene copolymer according to claim 1 comprising a xylene solubility at 25° C. of lower than 5 wt. %.

* * * * *

UNITED STATES PATENT AND TRADEMARK OFFICE
CERTIFICATE OF CORRECTION

PATENT NO. : 9,527,935 B2
APPLICATION NO. : 14/128286
DATED : December 27, 2016
INVENTOR(S) : Claudio Cavalieri et al.

It is certified that error appears in the above-identified patent and that said Letters Patent is hereby corrected as shown below:

On the Title Page

| | | |
|---|---|---|
| Column 1 Item (30) | Line 1 | Delete "11172929" and insert --11172929.9-- |
| Column 2 Item (57) Abstract | Line 6 | After "2.16 kg", insert --)-- |

In the Specification

| | | |
|---|---|---|
| Column 1 | Line 53 | Delete "10.1 dg/min." and insert --10.1 g/min.-- |
| Column 2 | Line 7 | After "2.16 kg", insert --)-- |
| Column 2 | Line 7 | Delete "10 gr/10" and insert --10 dl/10-- |
| Column 2 | Line 33 | After "2.16 kg", insert --)-- |
| Column 2 | Line 58 | Delete "200° to 300° C." and insert --200 °C. to 300 °C.-- |
| Column 3 | Line 30 | Delete "invention," and insert --invention.-- |
| Column 3 | Line 36 | Delete "propylene-hexene-1" and insert --propylene/1-hexene-- |
| Column 3 | Line 45 | Delete "hexene-1" and insert --1-hexene-- |
| Column 3 | Line 47 | Delete "hexene" and insert --1-hexene-- |
| Column 3 | Line 48 | Delete "MFR(1)" and insert --(MFR1)-- |
| Column 3 | Line 53 | Delete "MFR(2)" and insert --(MFR2)-- |
| Column 4 | Line 5 | Delete "150° to 250° C.," and insert --150 °C. and 250 °C.,-- |
| Column 4 | Line 9 | Delete "rispectively)." and insert --respectively).-- |
| Column 4 | Line 10 | Delete "propylene-hexene-1" and insert --propylene/1-hexene-- |
| Column 5 | Line 15 | Delete "80 to 120° C." and insert --80 °C. to 120 °C.-- |
| Column 5 | Line 49 | Delete "(cyclohexyl)(methyl)Si (OCH$_3$)$_2$," and insert --(cyclohexyl)(methyl)Si(OCH$_3$)$_2$,-- |

Signed and Sealed this
Fifth Day of February, 2019

Andrei Iancu
*Director of the United States Patent and Trademark Office*

CERTIFICATE OF CORRECTION (continued)
U.S. Pat. No. 9,527,935 B2

| | | |
|---|---|---|
| Column 5 | Line 62 | Delete "propylene-hexene-1" and insert --propylene/1-hexene-- |
| Column 6 | Line 52 | Delete "50 to 120° C." and insert --50 °C. to 120 °C.-- |
| Column 7 | Line 33 | Delete "110° to 150° C.," and insert --110 °C. to 150 °C.,-- |
| Column 7 | Line 34 | Delete "120° to 130° C." and insert --120 °C. to 130 °C.-- |
| Column 7 | Line 63 | Delete "t the boiling pint" and insert --to the boiling point-- |
| Column 8 | Line 17 | After "eliminated", insert --.-- |
| Column 8 | Line 24 | After "equation", insert --:-- |
| Column 8 | Line 45 | Delete "dinamometer" and insert --dynamometer-- |
| Column 9 | Line 14 | Delete "hexene-1" and insert --1-hexene-- |
| Column 9 | Line 22 | Delete "hexene-1" and insert --1-hexene-- |
| Column 9 | Line 28 | After "in", insert --Table 1.-- |
| Column 9 | Table 1, Line 9 | Delete "hexene-1" and insert --1-hexene-- |
| Column 9 | Line 54 | Delete "table 2." and insert --Table 2.-- |
| Column 9 | Table 2, Line 5 | Delete "Wt %" and insert --wt %-- |
| Column 9 | Table 2, Line 6 | Delete "Wt %" and insert --wt %-- |
| Column 9 | Table 2, Line 7 | Delete "Wt %" and insert --wt %-- |
| Column 10 | Line 16 | After "in", insert --Table 3.-- |
| Column 10 | Table 3, Line 3 | Delete "% wt" and insert --wt %-- |

In the Claims

| | | |
|---|---|---|
| Column 11 | Line 20 | In Claim 5, after "2.16 kg", insert --)-- |